United States Patent
Viedenz

[11] Patent Number: 5,695,713
[45] Date of Patent: Dec. 9, 1997

[54] DEVICE FOR THE DETECTION OF A LEVEL OF MOLTEN METALS

[75] Inventor: Michael Viedenz, Engelskirchen, Germany

[73] Assignee: W. Strikfeld & Koch GmbH, Germany

[21] Appl. No.: 575,821

[22] Filed: Dec. 20, 1995

[51] Int. Cl.$^6$ ................................................ C21D 11/00
[52] U.S. Cl. .................................. 266/94; 266/78
[58] Field of Search .......................... 266/78, 94, 99, 266/87; 73/86, 341, 344; 374/142

[56] References Cited

U.S. PATENT DOCUMENTS

| | | | |
|---|---|---|---|
| 1,889,510 | 11/1932 | Amsler | 266/94 |
| 4,220,319 | 9/1980 | Rohmann | 266/94 |
| 4,365,788 | 12/1982 | Block | 266/78 |

FOREIGN PATENT DOCUMENTS

| | | |
|---|---|---|
| 1166497 | 3/1964 | Germany. |
| 3116688 | 3/1987 | Germany. |

*Primary Examiner*—Scott Kastler
*Attorney, Agent, or Firm*—Young & Basile, P.C.

[57] ABSTRACT

A device for the detection of a level of molten metal in a molten vessel, especially a dosing furnace, is proposed in which a sensor made of electrically conductive material and which emits a signal on contact with the molten metal, is inserted, electrically insulated, into the casing of the vessel of the riser pipe provided in the vessel and terminates substantially flush with the surface of the casing. In the casing there is thus a contact surface, the adhesion of metal and metal oxide to which is substantially excluded.

8 Claims, 1 Drawing Sheet

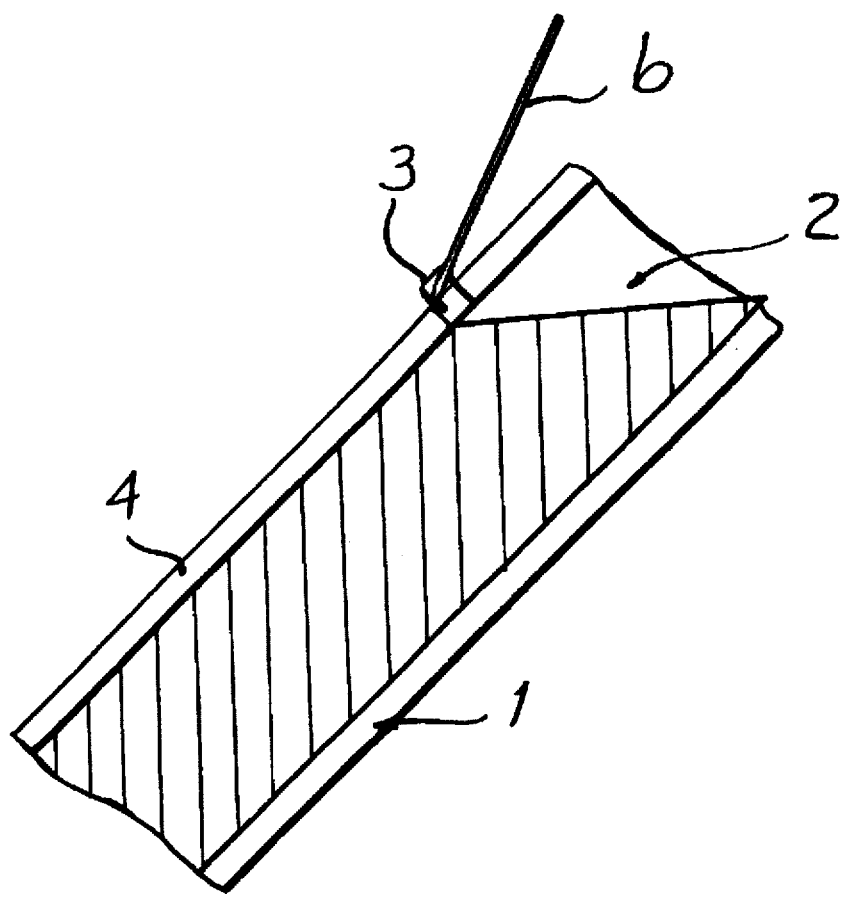

DEVICE FOR THE DETECTION OF A LEVEL OF MOLTEN METALS

BACKGROUND OF THE INVENTION

The invention relates to a device for the detection of a level of molten metal in a molten metal vessel, especially in a dosing furnace, according to the preamble of the main claim.

For the measuring of molten metal out of a dosing furnace the height to which the metal column rises in the metering pipe must be detected, because the metering amount is calculated on the basis of this information.

A sensor arrangement (U.S. Pat. No. 4,220,319) for dosing furnaces is known, in which the sensor consists of a metal needle standing vertical, or almost vertical, to the surface of the metal, and on contact with the surface of the molten metal this needle is swung upwards by an automatic mechanical system, so that it is not washed by the metal column as it continues to rise and thus no threads or similar deposits are drawn. For such a thread leads to contact being made too early with a rising metal column, for instance an aluminum column, and to a false reading of the furnace's internal pressure at the time of contact, causing metering errors. This known arrangement has some serious disadvantages. The mechanical swivel system for the movement of the electrode is very lavish and expensive and because it is fixed in the beam area of the metered molten metal is subject to heat radiation which leads to rapid wear of the bearings and the drive. Metal splashes and mist, consisting of spraying agents and lubricants, cause an increased maintenance frequency of the scanning electrode unit. In addition to this the metal electrode itself must be frequently ground and provided with lubricant. The scanning electrode construction also causes problems when the metering pipe is cleaned or changed. In practice the electrode unit is not swung back and as a consequence of this the electrode is frequently bent in cleaning, so that there is no longer any repeatable contact.

SUMMARY OF THE INVENTION

The purpose underlying the invention is to create a device for the detection of a level of molten metal in which no metal (oxide) residue remains adhering to the sensor, thus giving high repeatability of the contact, and the device being simple and inexpensive to construct.

This purpose is fulfilled according to the invention through the characteristic features of the main claim in conjunction with the features of the preamble.

As a result of the fact that the sensor is inserted into the casing of the molten metal vessel or of a riser pipe provided in the vessel, this casing having an electrically insulating effect, and forms a contact surface which terminates substantially flush with the surface of the casing, the expensive swivel system with the previously mentioned disadvantages can be dispensed with. No deposits occur and because of this the accuracy of the metering can be improved. The maintenance work necessary with previous technology can be avoided. Furthermore, the opening of the metering pipe lies completely free and can thus be easily cleaned.

Due to other measures, advantageous further developments and improvements are possible. It is particularly advantageous for a sensor to be used that extends widthways, i.e. parallel to the surface of the molten metal so that even where the surface of the metal is slightly undulatory an accurate first contact of a rising metal column is ensured.

An embodiment, given by way of example, of the device according to the invention is shown in the drawing and is explained in more detail in the following description.

BRIEF DESCRIPTION OF THE DRAWING

The only FIGURE shows schematically a section through the metering pipe of a dosing furnace with built-in sensor.

DESCRIPTION OF THE PREFERRED EMBODIMENT

The only FIGURE shows a metering pipe 1, preferably made of a non-conductive material such as ceramic, that is arranged at an angle in a dosing furnace—as shown—and above which the molten metal is measured out. For this measuring it is necessary for the height of the metal column 2 to be detected accurately and to do this a sensor 3 is inserted into the wall 4 of the metering pipe 1.

The sensor 3 is designed as a geometrical body, for instance a cube, cylinder or cone or similar and consists of electrically conductive material, preferably electrically conductive ceramic, the sensor being built into the wall 4 of the metering pipe 1 in such a way that its electrical contact surface 5 is parallel to and flush with the inner surface of the metering pipe 1. The sensor 3 is by preference built into the upper wall area of the metering pipe 1 which sits at an angle (as shown in the FIGURE), since there the probability of a deposit, i.e. the adhesion of any oxide residue, is even smaller. The sensor 3 is provided with a contact connection, linked for instance with a cable 6, which passes the signal given by the sensor 3 on contact with the surface of the metal column 2 on to a control unit.

In order to build in the sensor, a conical body made of electrically conductive ceramic is, for example, pressed into a corresponding, accurately fitting opening or slit in the wall 4 of the metering pipe, producing between the wall 4 and the body a contact which forms a seal. The wedge of the conical body projecting into the inner area of the metering pipe 1 is ground or polished, until a flush surface in relation to the inner surface of the wall 4 or a surface with soft or smooth polished junctions between the sensor and the inner wall area is produced. There are naturally other possible ways of inserting the sensor in the wall 4 and attaching it thereto, for instance through soldering or gluing with, for example, fine-grained, fireproof ready-mixed mortar, where the high temperatures have to be taken into account and where a smooth surface must be present in the interior of the metering pipe to avoid deposits. Should the metering pipe 1 also contain electrically conductive material, it must be ensured that electrical insulation is provided between wall 4 and sensor 3.

The sensor is suitable for applications in which it is necessary for there to be repeated or even periodic contact of a moving or static metal column which more or less washes round the contact surface 5 of the sensor 3.

The sensor 3 detects the outer covering of the molten metal column. The initial electrical contact of such a rising metal column occurs at the time at which the upper oxide skin has passed the lower edge of the contact surface 5 of the sensor 3. Where there is repeated contact and a slightly undulatory surface of the metal as well as where the sensor contact area is dot-like or not very extensive; it could happen that, on the basis of geometrically non-repeatable troughs and peaks, a peak meaning a late contact is detected. In order to achieve a good averaging of this statistical distribution, it is advantageous to use a sensor that extends widthways.

The width of the sensor 3 is determined by the average gap between two maximums or minimums of the surface of the molten metal and should be somewhat larger than it. For example the contact surface 5 of the sensor is designed as a long rectangle, the long side of the rectangle lying parallel to the surface of the metal column 2. In cases where no such great accuracy is required, a round contact surface or one provided with bends can also be chosen.

Since there are no longer any moving parts as in the prior art, in a further embodiment, given by way of example, a smaller heating system can be easily fitted near the metering pipe outlet which stabilizes the temperature of the outflow area of the molten metal in all operating situations and can help to improve the accuracy of the metering. Moreover, it is easily possible to close off the top of the outflow area by means of a casing, thus enabling the molten metal to be kept in an inert gas or nitrogen atmosphere. In this way oxide deposits on the outlet edge of the metering pipe and in the dosing furnace can be avoided, which results in a further improvement in the accuracy of the metering.

I claim:

1. A device for the detection of a level of molten metal in a molten metal vessel, the detection device comprising:
   a metering pipe disposed in the molten metal vessel, the metering pipe extending obliquely with respect to the molten metal vessel and having an upper deposit free area;
   a casing carried in the metering pipe, the casing having an inner surface and providing an insulating effect;
   a sensor made of electrically conductive ceramic and mounted in the casing in the upper deposit free area of the metering pipe, wherein the sensor emits a signal on contact with the molten metal; and
   a contact surface disposed on the sensor, the contact surface disposed substantially flush with the inner surface of the casing and communicating with the upper deposit free area of the metering pipe.

2. The device according to claim 1, further comprising a seal disposed between the casing and the sensor, wherein the seal comprises the sensor formed as a geometric body for insertion into a complementarily shaped geometric opening defined in the casing.

3. The device according to claim 2, wherein the body is inserted as a push fit.

4. The device according to claim 2, wherein the body is glued or soldered into the casing.

5. The device according to claim 1, wherein the contact surface has a long side parallel to the surface of the molten metal.

6. The device according to claim 1 wherein the molten metal vessel is a dosing furnace.

7. The device according to claim 1, wherein polished junctions are formed between the sensor and adjacent surrounding surfaces of the casing.

8. A device for the detection of a level of molten metal in a dosing furnace, the detection device comprising:
   a riser pipe disposed in the dosing furnace, the riser pipe extending obliquely to the dosing furnace and having an upper deposit free area;
   a casing disposed in the riser pipe, the casing having an inner surface and providing an insulating effect;
   a sensor made of electrically conductive ceramic and inserted into the casing in the upper deposit free area of the riser pipe, wherein the sensor emits a signal on contact with the molten metal;
   a contact surface disposed on the sensor, the contact surface disposed substantially flush with the inner surface of the casing and communicating with the deposit free area of the riser pipe;
   a seal disposed between the casing and the sensor, wherein the seal comprises the sensor formed as a geometric body for insertion into a complementarily shaped geometric opening defined in the casing.

* * * * *